US012267915B2

(12) United States Patent
Ramanathan et al.

(10) Patent No.: US 12,267,915 B2
(45) Date of Patent: Apr. 1, 2025

(54) DEVICE ADDRESS ROTATION METHOD TO PROTECT AGAINST UNCONSENTED TRACKING

(71) Applicant: Cisco Technology, Inc., San Jose, CA (US)

(72) Inventors: Shankar Ramanathan, Richardson, TX (US); Nagendra Kumar Nainar, Morrisville, NC (US); Robert E. Barton, Richmond (CA); Jerome Henry, Pittsboro, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 512 days.

(21) Appl. No.: 17/355,686

(22) Filed: Jun. 23, 2021

(65) Prior Publication Data
US 2022/0417734 A1    Dec. 29, 2022

(51) Int. Cl.
*H04W 8/26*    (2009.01)
*H04W 4/02*    (2018.01)
*H04W 12/12*    (2021.01)

(52) U.S. Cl.
CPC ............. *H04W 8/26* (2013.01); *H04W 4/023* (2013.01); *H04W 12/12* (2013.01)

(58) Field of Classification Search
CPC .......... H04W 8/26; H04W 4/23; H04W 12/12
USPC ........................................................ 726/25
See application file for complete search history.

(56) References Cited

U.S. PATENT DOCUMENTS

| 9,385,911 | B2 | 7/2016 | Vermani et al. |
| 10,212,583 | B1 | 2/2019 | Hooda et al. |
| 10,805,982 | B1 | 10/2020 | Buckley et al. |
| 11,722,369 | B2 | 8/2023 | Zhou et al. |
| 11,855,960 | B2 | 12/2023 | Henry et al. |
| 11,877,334 | B2 | 1/2024 | Ficara et al. |
| 11,962,588 | B2 | 4/2024 | Fang |
| 2003/0177267 | A1 | 9/2003 | Orava et al. |

(Continued)

FOREIGN PATENT DOCUMENTS

| WO | 2020010126 A1 | 1/2020 |
| WO | 2020148062 A1 | 7/2020 |

(Continued)

OTHER PUBLICATIONS

Alibaba Cloud, "The Principle of Arp-nat (MAC Address Translation)", Alibaba Cloud, Nov. 9, 2017, Retrieved from https://topic.alibabacloud.com/a/the-principle-of-arp-nat-mac-address-translation_8_8_30147619.html on Dec. 2, 2020, 7 Pages.

(Continued)

*Primary Examiner* — Anthony D Brown
(74) *Attorney, Agent, or Firm* — Edell, Shapiro & Finnan, LLC

(57) ABSTRACT

A network infrastructure component determines a risk measurement associated with a wireless client device's use of a device address, and provides an advisory with respect to an address rotation strategy of the wireless client device based on the risk measurement. In some embodiments, the risk measurement is based on one or more of an exposure, by the wireless client device, of information on the wireless network that identifies the wireless client device and/or a characterization of a security of the wireless network environment in which the wireless client device operates.

20 Claims, 7 Drawing Sheets

(56) References Cited

U.S. PATENT DOCUMENTS

| | | | |
|---|---|---|---|
| 2004/0059909 A1* | 3/2004 | Le Pennec | H04L 63/12 |
| | | | 713/153 |
| 2005/0050352 A1 | 3/2005 | Narayanaswami et al. | |
| 2006/0120317 A1 | 6/2006 | Zheng | |
| 2010/0093378 A1 | 4/2010 | Chin et al. | |
| 2014/0007236 A1* | 1/2014 | Krueger | G06F 21/566 |
| | | | 726/23 |
| 2015/0381565 A1 | 12/2015 | Thaler et al. | |
| 2016/0135041 A1 | 5/2016 | Lee et al. | |
| 2016/0135053 A1 | 5/2016 | Lee et al. | |
| 2016/0344681 A1 | 11/2016 | Lambert et al. | |
| 2017/0201930 A1 | 7/2017 | Chen et al. | |
| 2018/0115982 A1 | 4/2018 | Reddy et al. | |
| 2018/0324142 A1 | 11/2018 | Adrangi et al. | |
| 2019/0037390 A1 | 1/2019 | Hooda et al. | |
| 2019/0357143 A1 | 11/2019 | Wang et al. | |
| 2020/0107213 A1 | 4/2020 | Park et al. | |
| 2020/0107273 A1 | 4/2020 | Park et al. | |
| 2020/0351648 A1 | 11/2020 | Fang | |
| 2021/0068172 A1 | 3/2021 | Jeong et al. | |
| 2021/0168115 A1 | 6/2021 | De La Oliva et al. | |
| 2022/0086627 A1 | 3/2022 | Montemurro et al. | |
| 2022/0167256 A1 | 5/2022 | Kneckt et al. | |
| 2022/0200950 A1 | 6/2022 | Sekar et al. | |
| 2022/0224671 A1 | 7/2022 | De La Oliva et al. | |
| 2022/0264668 A1 | 8/2022 | Lumbatis | |
| 2023/0292315 A1 | 9/2023 | Li et al. | |

FOREIGN PATENT DOCUMENTS

| | | |
|---|---|---|
| WO | 2020221465 A1 | 11/2020 |
| WO | 2020229409 A1 | 11/2020 |

OTHER PUBLICATIONS

Andersdotter A., et al., "IEEE. 802.11 Randomized and Changing MAC Addresses Topic Interest Group Report", IEEE P802.11 Wireless LANs, IEEE 802.11-19/1442r9, Retrieved from https://mentor.ieee.org/802.11/dcn/19/11-19-1442-09-0rm-tig-draft-report-outline.odt, Article 19, Nov. 14, 2019, pp. 1-14.

Andersdotter A., "Summary of Discussions on Randomized and Changing MAC Addresses 2014-2019", IEEE P802.11, Wireless LANs, IEEE 802.11-19/588r2, Article 19, May 13, 2019, pp. 1-6.

Ansley C., et al., "Proposal for New Action Frame to Aid Mac Randomization Handling", IEEE 802.11-19/0179r3, Retrieved from https://mentor.ieee.org/802.11/dcn/19/11-19-0179-03-0arc-idquery-query-message-proposal.pptx, Jul. 18, 2019, pp. 1-9.

Ansley C., et al., "Proposed Text for ID Query Action Frame", IEEE P802.11, Wireless LANs, 11-19-0496-01-000m11-19-0496-01-000m, CommScope, Jul. 2019, pp. 1-4.

Ansley C., "Status of IEEE 802.11 Randomized and Changing MAC Address Study Group", IEEE, P802.11—Randomized and Changing MAC Address (RCM) Study Group (SG)—Meeting Update, Jan. 29, 2021, Retrieved from https://www.ieee802.org/11/Reports/rcmtig_update.htm on Oct. 26, 2021, pp. 1-2.

Aosp, "Privacy: MAC Randomization", Android Open Source Project, Retrieved from https://source.android.com/devices/tech/connect/wifi-mac-randomization on Dec. 4, 2020, 4 Pages.

Bellovin S.M., et al., "Privacy-Enhanced Searches Using Encrypted Bloom Filters", Columbia University Computer Science Technical Reports, CUCS-034-07, Apr. 27, 2011, pp. 1-16.

CISCO: "802.11w Management Frame Protection MFP", Cisco Meraki, Retrieved from https://documentation.meraki.com/MR/WiFi_Basics_and_Best_Practices/802.11w_Management_Frame_Protection_MFP, Oct. 5, 2020, pp. 1-2.

CISCO: "Configure 802.11w Management Frame Protection on WLC", Cisco, Retrieved from https://www.cisco.com/c/en/us/support/docs/wireless-mobility/wireless-lan-wlan/212576-configure-802-11w-management-frame-prote.html on Oct. 2020, 7 pages.

David, "Did MacOS Stop Allowing Changes to Wifi MAC Addresses?", Slashdot, Retrieved from https://mobile.slashdot.org/story/19/10/06/177216/did-macos-stop-allowing-changes-to-wifi-mac-addresses Oct. 6, 2019, 8 Pages.

Henry J., et al., "Parental Control Examples", IEEE 802.11-21/0804r1, Retrieved from https://mentor.ieee.org/802.11/dcn/21/11-21-0804-01-00bh-rcm-parental-control-examples.pptx, May 10, 2021, pp. 1-12.

Henry J., et al., "Randomized and Changing MAC Address Use Cases", Draft-henry-madinas-framework-02, Internet Engineering Task Force, Internet-Draft, May 3, 2021, pp. 1-18.

IEEE: "IEEE Standard for Information Technology—Telecommunications and Information Exchange between Systems—Local and Metropolitan Area Networks—Specific Requirements, Part 11: Wireless LAN Medium Access Control (MAC) and Physical Layer (PHY) Specifications, Amendment 4: Protected Management Frames", IEEE Std 802.11w™—2009, Sep. 11, 2009, 111 Pages.

Lee Y., et al., "Problem Statements for MAC Address Randomization", Draft-Lee-Randomized-Macaddr-ps-01, Internet Engineering Task Force, Internet-Draft, Sep. 22, 2020, pp. 1-6.

Marks R., "IEEE Std 802c: What's New and Useful in the Overview and Architecture", IEEE 802.1 Contribution, Sep. 2017, 42 Pages.

Razaque A., et al., "Restoring the Privacy and Confidentiality of Users Over Mobile Collaborative Learning (MCL) Environment", IEEE Transaction Latin America, vol. 9, No. 7, Dec. 2011, 13 Pages.

Stretch, "MAC Address Aggregation and Translation as an Alternative to L2 Overlays", PacketLife, Nov. 18, 2014, Retrieved from https://packetlife.net/blog/2014/nov/18/mac-address-aggregation-and-translation/ on Dec. 2, 2020, 9 Pages.

Volz B., et al., "Link-Layer Addresses Assignment Mechanism for DHCPv6", draft-bvtm-dhc-mac-assign-02, Dynamic Host Configuration (DHC), Oct. 20, 2018, pp. 1-18.

Wang P-C., et al., "MAC Address Translation for Enabling Scalable Virtual Private LAN Services", 21st International Conference on Advanced Information Networking and Applications Workshops (AINAW'07), May 2007, 6 Pages.

Wi-Fi: "WPA3 Specification", WiFi Alliance, Version 3, Retrieved from https://www.wi-fi.org/file/wpa3-specification, Dec. 20, 2019, 30 Pages.

Wikipedia: "CCMP (Cryptography)", Wikipedia The Free Encyclopedia, Jun. 2021, Retrieved from https://en.wikipedia.org/wiki/CCMP_(cryptography) on Jul. 12, 2021, 3 Pages.

Zuniga J.C., et al., "MAC Address Randomization," draft-zuniga-mac-address-randomization-01, IETF, Network Working Group, Internet-Draft, Jul. 12, 2021, pp. 1-14.

\* cited by examiner

DEVICE ADDRESS ROTATION METHOD TO PROTECT AGAINST UNCONSENTED TRACKING

TECHNICAL FIELD

The present disclosure relates to secure wireless networking.

BACKGROUND

In an effort to improve privacy of a mobile device user, many mobile operating system vendors are periodically changing (or "rotating") a device address (e.g. a station address) used to identify a mobile device on a wireless network. By changing the device address, it can be more difficult for an eavesdropper to track a location of a mobile device user, but also, in some circumstances, more difficult to monitor their online activities. While rotation of a wireless device's address can improve privacy, a wireless client device typically utilizes a relatively simple algorithm to determine when to perform a device address rotation. For example, many wireless client devices rotate their device addresses after an existing device address has been utilized for at least a threshold period of time.

DESCRIPTION OF EXAMPLE EMBODIMENTS

Overview

Figure 1:
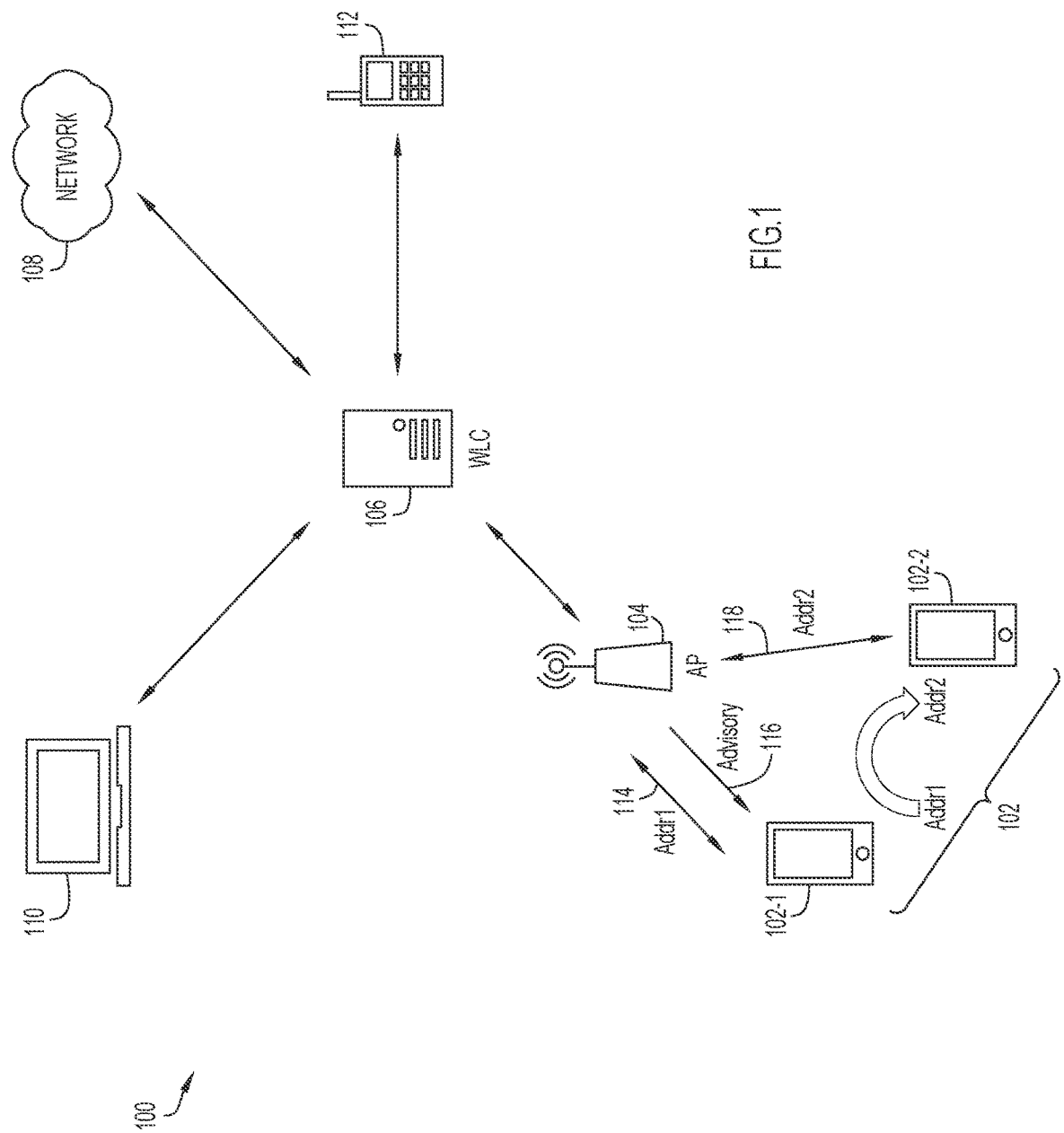
FIG. 1 is an overview diagram illustrating a network environment configured to provide wireless client device address rotation advisories, in accordance with an example embodiment.

Disclosed are embodiments that provide a device address rotation advisory to a wireless client device operating on a wireless network. A network infrastructure device, such as an access point, analyzes communication of the wireless client device on the wireless network. A risk measurement associated with the wireless client device is then determined based on the analyzing. The risk measurement is evaluated against one or more criterion, and an advisory is provided to the wireless client device based on the evaluation of the risk measurement.

Example Embodiments

Disclosed herein are embodiments that provide for improved randomized and changing media access control (MAC) addresses (RCM) methods by monitoring activity on a wireless network to determine a risk assessment associated with a wireless client device. A risk associated with operation of the wireless client device on a wireless network can be affected by a variety of factors, such as an elapsed time the wireless client device has been utilizing a particular device address on the wireless network, or as a result of malicious activity occurring on the wireless network. Based on the risk assessment, an access point (AP) or other network infrastructure device (such as a wireless local area network controller (WLC) or a network management center) provides an advisory to the wireless client device, indicating a suggested device address rotation strategy for the wireless client device.

The risk assessment is based, in some embodiments, on an amount or frequency at which the wireless client device is exposing unprotected identifiers or data on the network, where the unprotected data can be used to uniquely identify the wireless client device. For example, a wireless client device transmits, in some embodiments, personally identifiable information (PII) in an unprotected manner over a wireless network. Alternatively, the wireless client device transmits, in some circumstances, information that can indirectly identify a user of the wireless client device (e.g. such as payment card industry (PCI) data).

In some embodiments, one or more network infrastructure components monitor a frequency or other characteristic of probe messages on the wireless network. The probe messages are broadcast in some circumstances or directed to a particular wireless client device in other circumstances. Based on, in part, a frequency, source device address of the probe messages, or other probe message characteristics, the network infrastructure develops an assessment of a risk associated with the wireless network environment generally and/or with respect to a particular wireless client device. This assessment of risk is then applied to a risk measurement associated with the wireless client device.

Some embodiments establish a correlation between device addresses of multiple radios of a single wireless client device. Thus, for example, some embodiments detect a maximum time that a wireless client device has been identifiable via any one of multiple device addresses the wireless client device expresses on a wireless network. If one of the multiple device addresses is modified or otherwise rotates while other addresses remain stable, the rotation of the one device address does not appreciably improve privacy of a user of the wireless client device, and thus a risk measurement associated with the wireless client device is adjusted based on this determination.

Some embodiments generate a signature of a sleep/wake pattern or block acknowledgment pattern exhibited by a wireless client device. To the extent the signature is unique on the wireless network or is exhibited by a relatively small number of wireless client devices (e.g. a number of devices below a predefined threshold), the signature contributes to a risk that the wireless client device is identifiable via eavesdropping on the wireless network.

In some embodiments, a density metric of wireless client devices on a wireless network contributes to the risk measurement. For example, a low density of stations of the same type can made identification of a particular station easier to accomplish. In some embodiments, the density metric is based on a density weight function. In some embodiments, the density weight function is represented by Equation 1 below:

$$\text{Density weight} = \frac{-1}{1 - n/m} \quad (1)$$

where:
M is a number of wireless client devices in an area of a predefined size, and
N is a number of wireless client devices displaying similar parameters as a particular wireless client device within the area.

Thus, some embodiments determine an individual density weight score of each wireless client device within a wireless network environment (e.g. each wireless client device associated with an AP). Some embodiments apply a second weight (e.g. an exposure score) to the density weight based on a time a wireless client device has maintained an existing device address. The exposure score is reset, in some of these embodiments, to a default value (e.g. one (1)) upon rotation of the device address by the wireless client device.

In some embodiments, when a determination is made that a risk measurement associated with a wireless client device indicates the risk is beyond a configurable threshold, the wireless client device is provided with a notification message. The notification message indicates a recommendation regarding a rotation strategy of the wireless client device. The notification indicates, in various embodiments, one or more of a recommended time interval between address rotations, a recommended minimum and/or maximum time interval between address rotations, a time before a next address rotation, or that the wireless client device rotate its device address upon receipt of the notification message. In some embodiments, the notification is encoded in an action frame. Thus, in some embodiments, the action frame indicates one or more of a rotate now indicator, rotate more frequently indicator, rotate less frequently indicator.

In some embodiments, the action frame is encoded to indicate one or more indications of a nature of the wireless client device exposure. In some embodiments, a common scoring format is utilized (e.g. analogous to the common vulnerability scoring system (CVSS)).

In another embodiment, a network infrastructure component generates a warning to the wireless client device by forcing the wireless client device to re-accept a customized version of the hotspot acceptable use policy (AUP). This customized version of the hotspot AUP warns, in some embodiments, the wireless client device and/or the user of the wireless client device that they are at risk and suggests they initiate a device address rotation.

In some embodiments, the network infrastructure initiates one or more actions to improve privacy and/or security of a wireless client device based on an assessment of risk to the wireless client device. For example, in some embodiments, upon determining that communication, by the wireless client device, with a first access point exposes the wireless client device to a level of risk that exceeds a predefined threshold, the network infrastructure identifies a second AP that is within communication range of the wireless client device, and sends the wireless client device a basic service set (BSS) transition management (BTM) message in an attempt to cause the wireless client device to change a channel and avoid risk associated with an existing channel.

In some embodiments, one or more APs within a communication range of a wireless client device determined to be at an increased risk, increase a privacy entropy of the wireless client device, by coordinating the sending, at random intervals, of management frames having a source address indicating the wireless client device, but also having unique supported parameter values. This method can confuse fingerprinting algorithms employed by a nefarious actor eavesdropping on the wireless network. In some embodiments, parallel streams of exchanges are generated on additional channels, which makes eavesdropping more difficult. These activities are tailored so as to avoid disrupting communication of the wireless client device.

FIG. 1 is an overview diagram illustrating a network environment 100 configured to provide wireless client device address rotation advisories, in accordance with an example embodiment. FIG. 1 includes a wireless client device 102 in communication with an access point (AP) 104. The AP 104 is in communication with a wireless network controller (WLC) 106. The WLC 106 communicates with a network 108. Thus, FIG. 1 shows a communication path is established between the wireless client device 102 and the network 108 via the AP 104 and WLC 106. FIG. 1 also illustrates that the wireless client device 102 shares the network environment 100 with at least two other devices, a laptop device 110 and a smart phone device 112. Note that while the wireless client device 102 is illustrated as a smart phone device with a relatively large touch screen, embodiments of wireless client devices as described in this disclosure are not limited to this particular type of wireless client device. For example, the wireless client device takes the form, in various embodiments, of a laptop, desktop, tablet, mini-PC, flip phone, or virtually any electronic device configured to communicate on a wireless network.

The wireless client device 102 utilizes a first device address during wireless communication 114 with the AP 104. The device address identifies the wireless client device 102 to the AP 104 and to other devices on a wireless network. A first image 102-1 of the wireless client device 102 represents the wireless client device 102 when the wireless client device 102 is identified via a first device address.

Embodiments of this disclosure provide for determination of a risk measurement associated with the wireless client device 102 and its operation within the network environment 100. In some embodiments, the risk measurement is determined by a network infrastructure device, such as the AP 104 or the WLC 106. The risk measurement is determined via analyzing communications of the wireless client device, such as wireless communication 114. In some embodiments, the AP 104 identifies exposure of unprotected identifiers by the wireless client device 102, which can provide an ability to identify a user of the wireless client device 102 or the wireless client device 102. The AP 104 also monitors, in some embodiments, one or more characteristics of the network environment 100 to determine the risk measurement associated with the wireless client device 102. For example, one or more of the laptop device 110 and/or smart phone device 112 can be under control of a nefarious actor who is attempting to compromise one or more devices present within the network environment 100. For example, in some embodiments, a nefarious actor generates probe request messages within the network environment 100 in an attempt to discover certain information about devices within the environment, which may then be used to compromise those devices or at least obtain additional information about users of those devices. Based on information obtained via analyzing the wireless communication 114 and/or the network environment 100, the AP 104 generates an advisory message 116 to the wireless client device 102.

The advisory message 116 indicates one or more suggested attributes of a device address rotation strategy employed by the wireless client device 102. For example, the advisory message 116 indicates, for example, one or more of a recommended time interval between address (e.g., MAC address) rotations, a minimum and/or maximum time interval between rotations, a time interval before a next rotation (e.g. zero or some delay value), or other attributes.

The wireless client device 102 is shown rotating the device address from the first device address of wireless communication 114 to a second device address used for wireless communication 118. A second image 102-2 of the wireless client device 102 represents the wireless client device 102 when it is identified via the second device address.

Figure 2A:
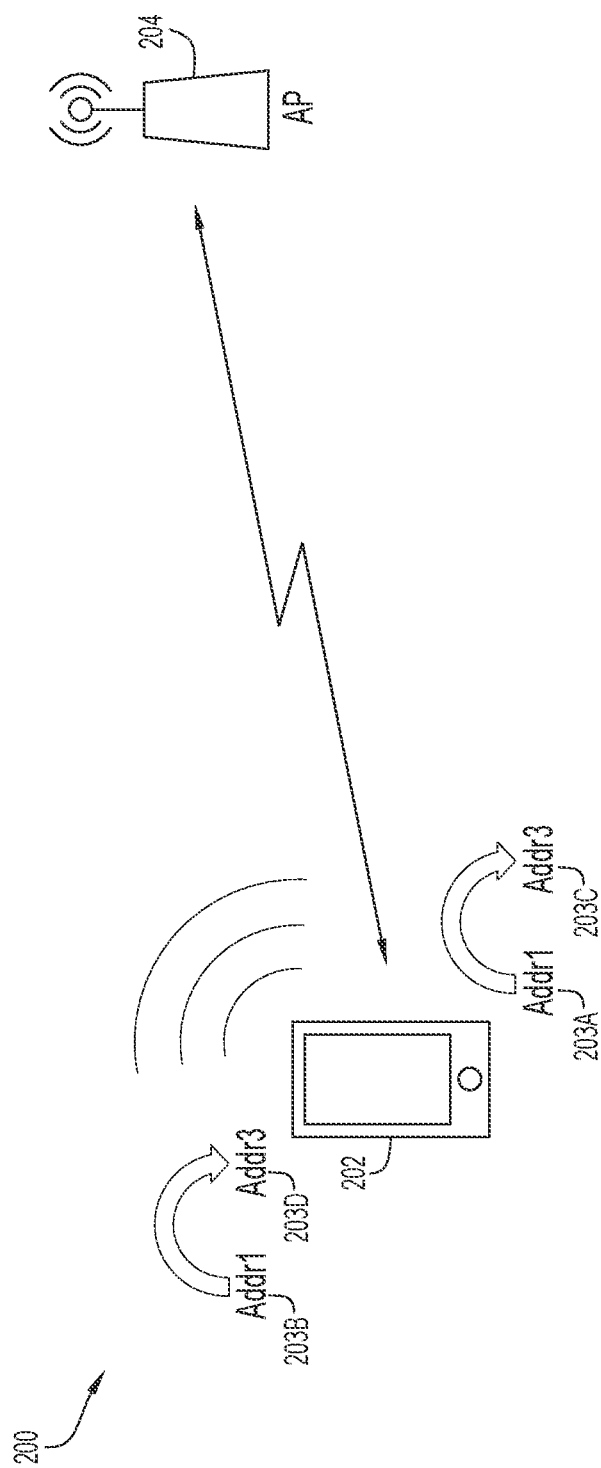
FIG. 2A illustrates a wireless client device that is configured to identify itself over the air via two device addresses, according to an example embodiment.

FIG. 2A illustrates wireless environment 200 that includes a wireless client device 202. The wireless client device 202 includes at least two radios and can therefore identify itself over the air via two device addresses. In particular, the wireless client device 202 of FIG. 2A includes a first device address 203A that identifies the wireless client device 202 on an Electrical and Electronics Engineers (IEEE) 802.11 wireless network. The wireless client device 202 communicates with an AP 204 via the first device address 203A. The wireless client device 202 also generates radio signals on a second network (e.g., a Bluetooth® network) and identifies itself on the second network via a second device address 203B.

The wireless client device 202 rotates its 802.11 device address from the first device address 203A to a third device address 203C. However, while the wireless client device 202 continues to use the second device address 203B, the wireless client device 202 can be correlated and tracked by an entity eavesdropping on transmissions of the wireless client device 202. Thus, the wireless client device 202 rotates its second network device address, the second device address 203B, to a fourth device address 203D.

Figure 2B:
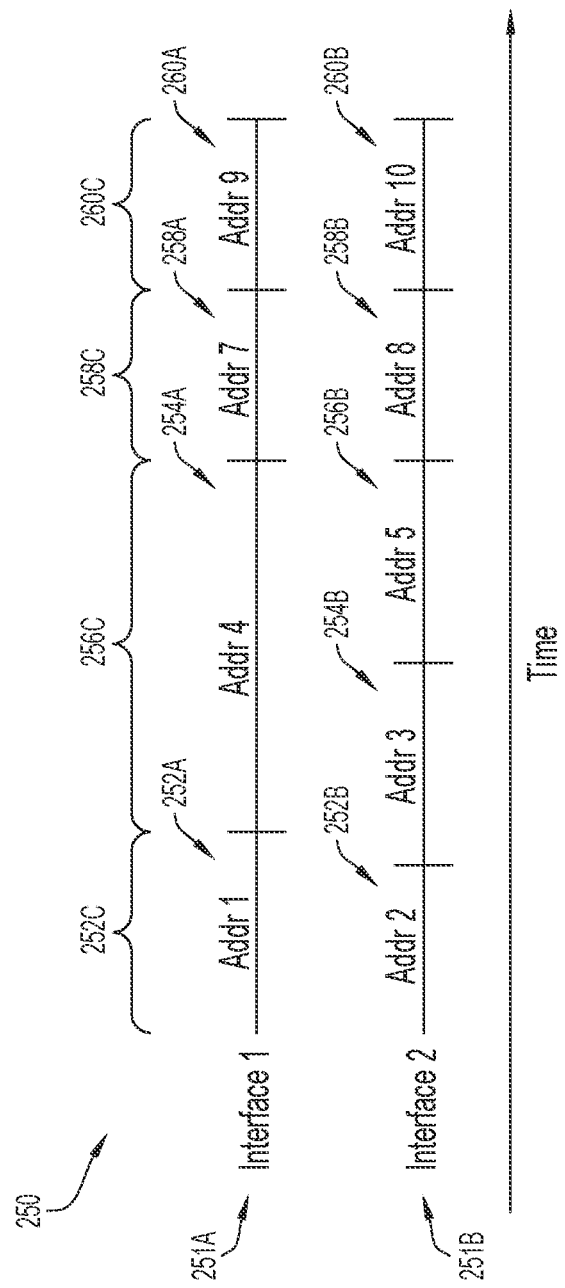
FIG. 2B illustrates identification of a wireless client device that includes two network interfaces with two different device addresses, according to an example embodiment.

FIG. 2B illustrates a timeline 250 showing device address rotations of a wireless client device over a period of time. The wireless client device includes two network interfaces (two radios) with two different device addresses, such as depicted in FIG. 2B. FIG. 2B shows that a first network interface 251A identifies a wireless client device via an address 252A. A second network interface 251B identifies the wireless client device via an address 252B. While FIG. 2B shows that the second network interface 251B rotates its device address from address 252B to address 254B, the first network interface 251A does not rotate from the address 252A to address 254B until a later time, represented by time period 252C. Thus, the rotation from the address 252B to the address 254B was ineffective at improving privacy of the wireless client device, and the applicable time period for considering risk associated with the wireless client device is appropriately time period 252C. FIG. 2B also shows a second rotation by the second network interface 251B from the address 254B to an address 256B. However, the first network interface 251A continues to use the address 254A for a time period that extends beyond the second network interface rotation to the address 256B, which is represented by the time period 256C. Thus, the earlier rotation of the second network interface 251B from the address 254B to the address 256B is ineffective at improving privacy of the wireless client device.

FIG. 2B then shows two additional sets of address rotations that occur on each interface simultaneously. A first set of rotations occur when the first network interface rotates from the address 254A to an address 258A, while the second network interface rotates from the address 256B to the address 258B. Thus, this first set of rotations, because they occur on both the first network interface 251A and the second network interface 251B, are effective at improving privacy of the wireless client device. Because both the first network interface 251A and the second network interface 251B both rotate their device addresses at the same time, a relevant exposure period of the device is represented by the elapsed time 258C. Similarly, a second set of address rotations occurs when the first network interface 251A rotates from the address 258A to an address 260A, in concert with a rotation of the second network interface 251B from the address 258B to an address 260B. This second set of rotations is also effective at improving privacy of the wireless client device. Because both the first network interface 251A and the second network interface 251B both rotate their device addresses at the same time, a relevant exposure period of the device is represented by the elapsed time 260C.

Figure 3:
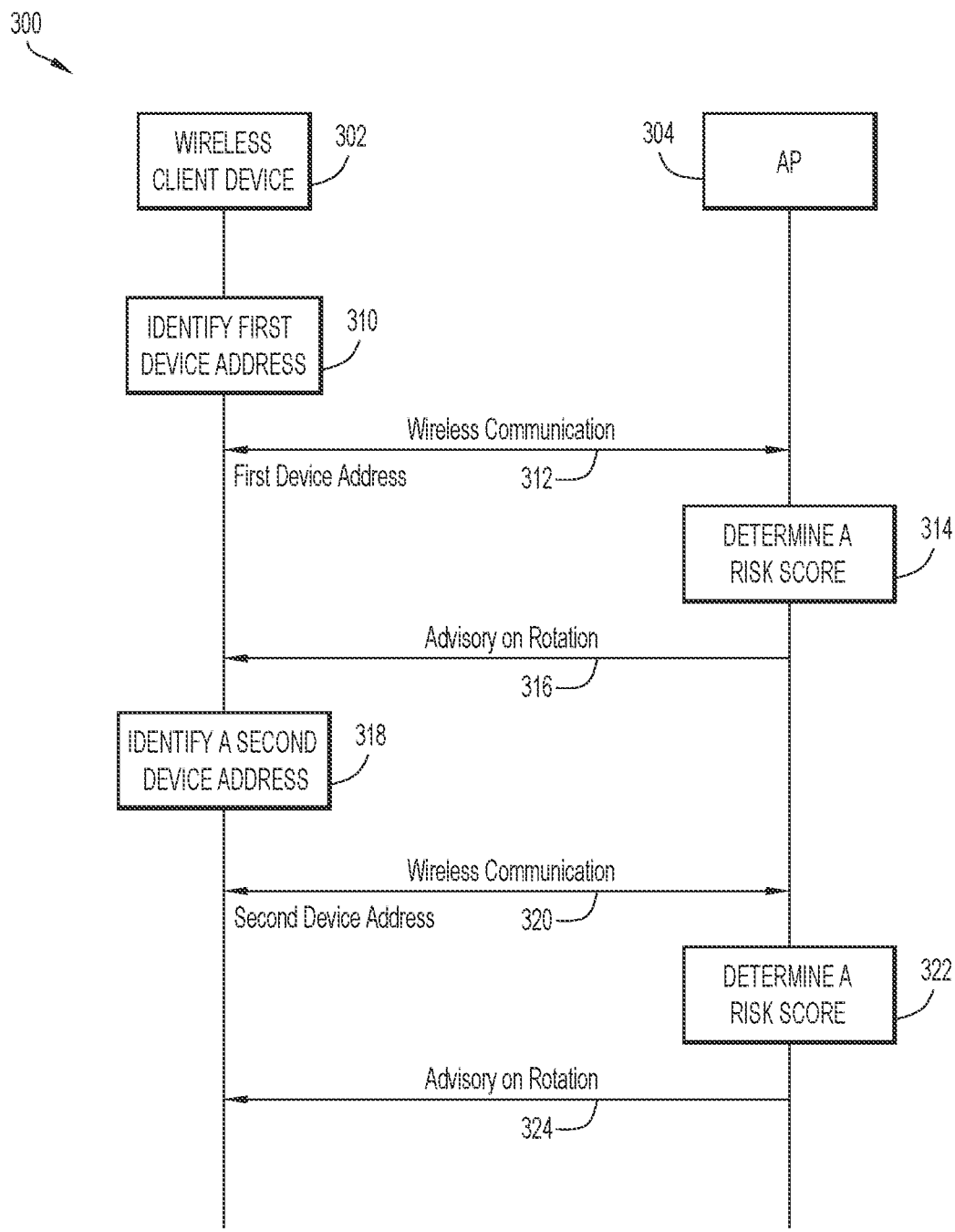
FIG. 3 is a sequence diagram showing a network infrastructure component providing a device address rotation advisory to a wireless client device, according to an example embodiment.

FIG. 3 is a sequence diagram 300 showing a network infrastructure component providing a device address rotation advisory message to a wireless client device according to an example embodiment. FIG. 3 shows a wireless client device 302 and an AP 304. The wireless client device 302 identifies a first device address (e.g. a MAC address) in step 310, and utilizes the first device address to identify itself in wireless communication 312 between the wireless client device 302 and the AP 304.

The AP 304 determines, in step 314, a risk score or measure associated with the wireless client device 302 based on the wireless communication 312. As discussed above, the risk measurement determined by the AP 304 considers one or more of a type of data exposed by the wireless client device 302 in the wireless communication 312, an amount of time that the wireless client device 302 utilizes the first device address to identify itself on the wireless network in the wireless communication 312, one or more signatures of wireless client device 302 behavior on the wireless network, or other characteristics of the wireless communication 312 and/or the wireless network environment in which the wireless client device 302 is operating.

The AP 304 then generates an advisory message 316 that is based on the risk measurement determined in step 314. Examples of the advisory message 316 are discussed below with respect to FIG. 4.

After receiving the advisory message 316, the wireless client device 302, in some embodiments, adapts its address rotation strategy based on the information included in the advisory message 316. In other embodiments, the wireless client device 302 takes no action based on information include in the advisory message 316.

In step 318, the wireless client device 302 identifies a second device address. In some embodiments, a timing of the identification of the second device address, and its use for wireless communication 320, is based on information included in the advisory message 316. For example, the advisory message 316 defines one or more of a recommended elapsed time before a next rotation, a suggested rate of address rotation, a suggested interval length between address rotations, or other attributes of device address rotation. Some embodiments of the advisory message 316 include information justifying the suggestions or recommendations included in the advisory message. For example, if the advisory message 316 indicates a faster rotation rate, the advisory message 316 also includes, in some embodiments, an indication that the rate is based on the detection of probe activity on the wireless network that is above a predefined threshold (which can indicate a nefarious actor is at work attempting to discover aspects of the wireless network that can be used for exploitation.

Thus, a particular timing of when the wireless client device 302 begins to communicate, via the second device address as depicted in wireless communication 320, is based, in at least some embodiments, on the advisory message 316. The AP 304 then determines a second risk measurement of the wireless client device 302 based on the wireless communication 320 in step 322. In some embodiments, the determination of the second risk measurement also considers at least a portion of the wireless communication 312. The AP 304 then sends a second advisory message 324 to the wireless client device 302, with the second advisory message 324 indicating one or more recommendations for address rotation based on the risk measurement computed in step 322.

Figure 4:
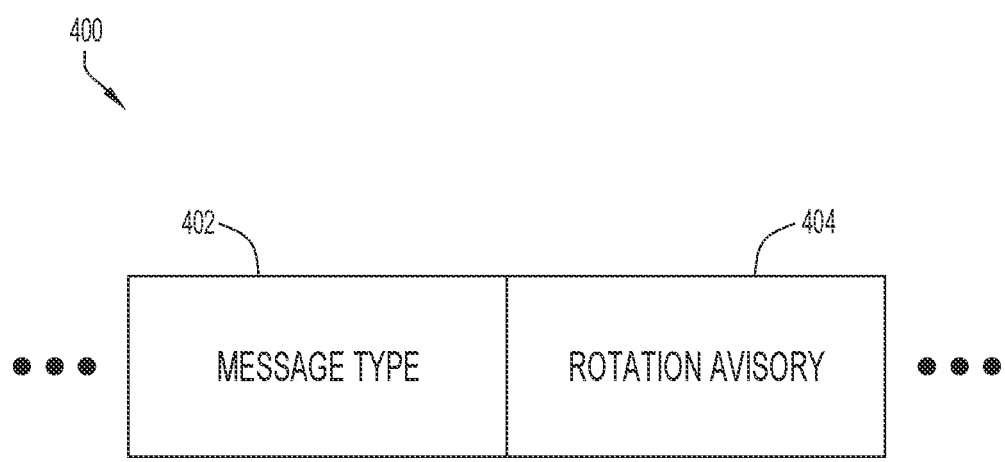
FIG. 4 illustrates an advisory message, in accordance with an example embodiment.

FIG. 4 illustrates an advisory message in accordance with an example embodiment. The advisory message 400 discussed below with respect to FIG. 4 is transmitted by a network infrastructure component, such as an AP, to a wireless client device, advising the wireless client device on one or more attributes associated with device address rotation. The attributes can include a frequency of device address rotation, a minimum and/or maximum time between device address rotations, a recommended time before the next address rotation, or other attributes.

The advisory message 400 includes a message type field 402 and a rotation advisory field 404. The message type field 402 indicates a predefined value that indicates the advisory message 400 is in fact an advisory message. The rotation advisory field 404 indicates one or more recommended attributes associated with address rotation by a wireless client device receiving the advisory. As discussed above, the rotation advisory field 404 indicates one or more of a frequency of device address rotation, a minimum and/or maximum time between device address rotations, a recommended time before the next address rotation, or other attributes. Note that since the advisory message 400 generally indicates recommendations or suggestions by a network infrastructure component to a wireless client device, any indications in the advisory message 400 are necessarily complied with by the wireless client device, which, in at least some embodiments, may determine address rotation actions that conflict with recommendations included in the advisory message 400.

Figure 5:
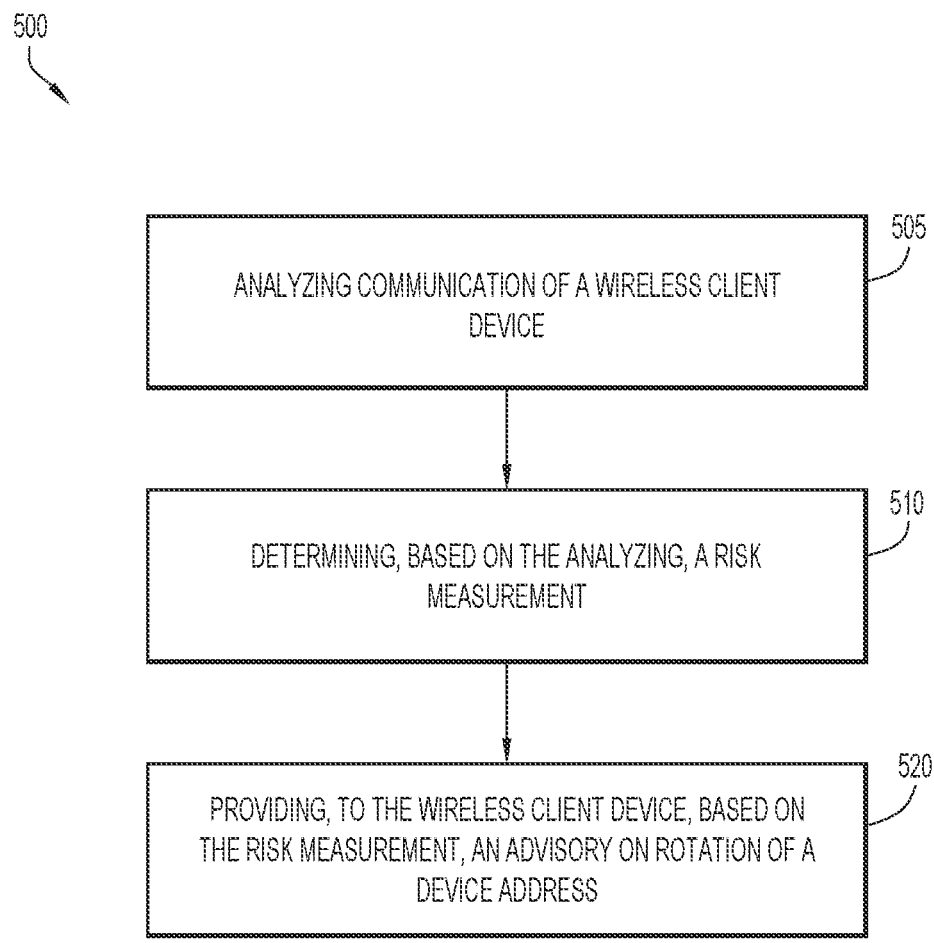
FIG. 5 is a flowchart of a method of advising a wireless client device on an address rotation strategy, in accordance with an example embodiment.

FIG. 5 is a flowchart of a method of advising a wireless client device on an address rotation strategy, in accordance with an example embodiment. In some embodiments, the method 500 discussed below with respect to FIG. 5 is performed by a network infrastructure device, such as an AP.

In operation 505, communication of a wireless client device is analyzed. Analyzing the communication includes receiving one or more network messages transmitted by and/or to the wireless client device. In some embodiments, the analyzing detects that the wireless client device is exposing unprotected identifiers on the wireless network in an unsecure manner. For example, operation 505 includes, in some embodiments, detection of the transmission of PII or PCI type information by the wireless device on the wireless network. Other information that can also uniquely identify the wireless client device is also detected in some embodiments of operation 505. For example, a user name, account name, wireless client device specific identifiers, such as one or more of a unique device identifier (UDID), an identifier for advertisers (IDFA) or an android Ad Identifier are detected in at least some embodiments.

Some embodiments of operation 505 detect whether the wireless client device is operating multiple radios, and/or whether the wireless client device is identifying itself on the wireless network via multiple different device addresses and/or different network interfaces. Based on this determination, some embodiments of operation 505 then determine a maximum time a device address has been in use by the wireless client device. Thus, if, for example, the wireless client device has recently rotated a device address of a first network interface but has not recently rotated a second device address of a second network interface, the risk assessment of the wireless client device is based on the device address in use for a longest period of time.

Some embodiments of operation 505 determine a frequency of probe traffic on the wireless network, and/or a frequency of probe traffic generated at the wireless client device in particular (e.g. identifying the wireless client device via its device address in a destination address field of a probe request message). In some embodiments, a higher frequency of probe traffic present on the wireless network generally increases the risk measurement of the wireless client device. In some embodiments, the frequency of probe traffic is normalized by a number of wireless client devices communicating on a wireless network, and then the normalized value is used to determine a relative risk present within the network environment.

In some embodiments, one or more signatures of traffic communicated by the wireless client device are determined in operation 505. For example, in some embodiments, a signature or pattern of block acknowledgment traffic is determined. The signature or pattern defines or includes, for example, a time delay between block acknowledgment packets, a number of packets typically acknowledged by a block acknowledgment, or other indications that provide a prediction of when the wireless client device will generate a block acknowledgment. In some embodiments, a relative uniqueness of the block acknowledgment signature is then determined in operation 505. For example, a number of devices exhibiting a similar pattern of black acknowledgment traffic is determined. This provides an indication of how easy it may be for a nefarious actor to identify traffic associated with the wireless client device based on its pattern of block acknowledgment. The number of devices is then used, in some embodiments, in determining a risk measurement associated with the wireless client device, as discussed further below.

Some embodiments of operation 505 detect patterns in transitions by the wireless client device from a wake state to a sleep state, and then from the sleep state back to the wake state. These transitions and their respective timing are stored. Some embodiments also record a type or level or amount of network activity directed to or originating from the wireless client device that precipitates the transition between each state. A relative uniqueness of the detected patterns in sleep/wake transitions is then characterized in operation 505. For example, a number of devices that exhibit a similar pattern is determined in some embodiments, and utilized when determining a risk measurement, as discussed below.

Some embodiments determine a pattern or signature of packet transmissions by the wireless client device. The packet transmission patterns or signatures characterize, in some embodiments, an amount of traffic transmitted during each of a plurality of time periods within a recurring time period, a number of new connections initiated during each of the plurality of time periods, a median, maximum, and minimize lifetime of connections established by the wireless client device. Some embodiments characterize vendor specific information elements transmitted by the wireless client device. A signature of vendor specific information elements is generated that indicates a number, type, and timing associated with the transmission of vendor specific information elements.

As discussed above, some embodiments of operation 505 determine a density of other wireless client devices on the wireless network. In some embodiments, the density is filtered to include only those devices having an equivalent type as that of the wireless client device. The type is determined in some embodiments, based on the signature of vendor specific information elements discussed above, or other network activity that indicates a manufacture, model number, operating system vendor, operating system version, or other type attributes of the wireless client device observable on the wireless network. In some embodiments, the type of the wireless client device is explicitly communicated by the wireless client device to a network infrastructure component performing the method 500. In some embodiments, the density metric is filtered to consider only those devices located within a predefined threshold distance of the wireless client device. The distances are determined, in some embodiments, by receiving explicit location information from wireless client devices communicating with the network infrastructure on the wireless network. In some embodiments, triangulation methods are used based on signal strengths of the wireless client devices to approximate at least some of the wireless device locations.

Some embodiments of operation 505 determine a transmission power of the wireless client device. The transmission power is determined, in some embodiments, by receiving a transmission power indication from the wireless client device, or by deriving a transmission power of the wireless client device based on a determined distance between the wireless client device and a network infrastructure component receiving signals from the wireless client device, and a strength at which those signals are received. In some embodiments, a network infrastructure device defines the transmission power of the wireless client device and provides this information to the wireless client device, and therefore is already aware of the transmission power without a need to receive it from the wireless client device or otherwise derive it explicitly for the purposes of determining the risk measurement.

In operation 510, a risk measurement is determined based on the analyzing. Determination of the risk measurement includes one or more of the characteristics of the wireless communication discussed above with respect to operation 505, such as one or more of a signature of block acknowledgment or packet transmission behavior, a signature of vendor specific information element transmission, a signature of sleep/wake behavior, an amount or frequency at which the wireless client device exposes PII, PCI, or device identifying type data on the wireless network, a length of time the wireless client device has used any one device address on any one of one or more network interfaces, a frequency of probe traffic on the wireless network generally or more specifically probe traffic directed at the wireless client device, or a transmission power of the wireless client device. One or more of these risk measurement components are assigned a different weight in at least some embodiments, with the risk measurement combining each of the components according to its respective weight.

In operation 520, an advisory is provided to the wireless client device based on the risk measurement. In some embodiments, the risk measurement is compared to one or more criterion, with the evaluation of the one or more criterion determining the content of the advisory. In some embodiments, the advisory is generated to indicate a delay in device address rotation. Thus, for example, if evaluation of the criterion indicate the wireless client device is experiencing a relatively lower amount of risk (e.g. the risk measurement is below a predefined threshold), the advisory is generated to indicate the delay.

Some embodiments define a plurality of risk measurement ranges, and associate a predefined time interval between device address rotations with each of the ranges. Thus, in these embodiments, operation 520 determines within which of the predefined ranges the risk measurement of operation 510 falls, and generates the advisory to indicate an address rotation time interval consistent with the determined range. In some embodiments of operation 520, a determination is made that the wireless client device and/or user of the wireless client device is to agree to a new acceptable use policy, and the advisory indicates the new acceptable use policy and requests an acknowledgment of same. The acceptable use policy, in some embodiments, defines a maximum time interval without a device address rotation. Some embodiments of the acceptable use policy also define a minimum time between device address rotations, so as to place a limit on a burden of network infrastructure caused by device address rotations. In some embodiments, the advisory provided to the wireless client device is transmitted over a wireless network to the wireless client device, and/or includes one or more of the fields discussed above with respect to the advisory message 400.

Figure 6:
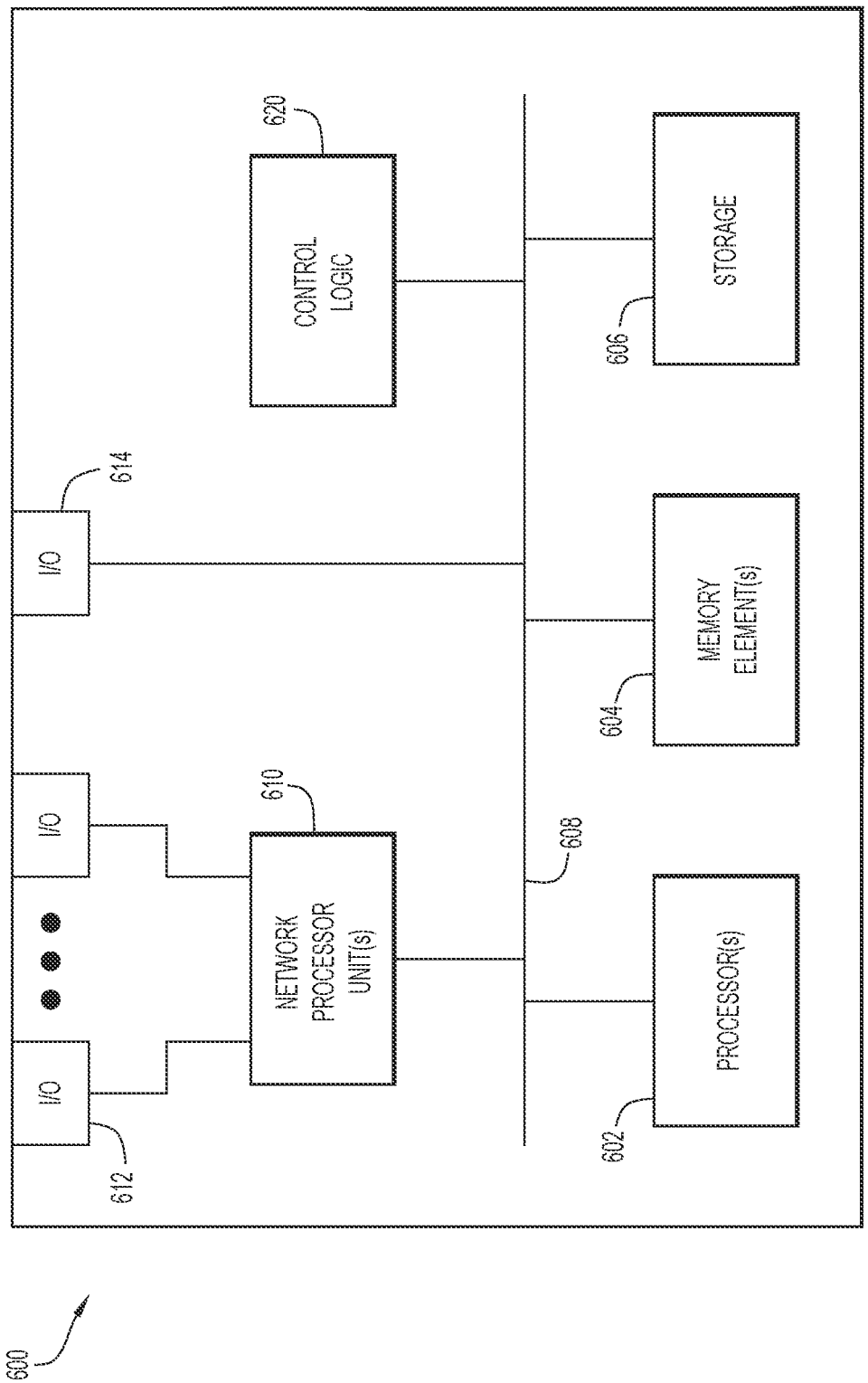
FIG. 6 is a hardware block diagram of a device that may perform functions associated with operations discussed herein in connection with the techniques depicted in any one or more of FIGS. 1-5.

FIG. 6 is a hardware block diagram of a device 600 that may perform functions associated with operations discussed herein in connection with the techniques depicted in any one or more of FIGS. 1-5. In various embodiments, any of the devices described above (e.g., a wireless client device, an AP, or a wireless network controller) implement, in some embodiments, a computing architecture analogous to that described below with respect to the device 600.

In at least one embodiment, the device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for device 600 can overlap in any manner and are not limited to the specific allocation of instructions and/or operations described herein.

In at least one embodiment, processor(s) 602 is/are at least one hardware processor configured to execute various tasks, operations and/or functions for device 600 as described herein according to software and/or instructions configured for device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, physical layer (PHY), controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with device 600, and/or logic configured for memory element(s) 604 and/or storage 606. For example, any logic described herein (e.g., control logic 620) can, in various embodiments, be stored for device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of device 600 to communicate in order to exchange information and/or data. Bus 608 can be implemented with any architecture designed for passing control, data and/or information between processors, memory elements/storage, peripheral devices, and/or any other hardware and/or software components that may be configured for device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between device 600 and other systems, devices, or entities, via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between device 600 and other systems, devices, or entities to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to device 600. For example, I/O interface(s) 614 may provide a connection to external devices such as a keyboard, keypad, a touch screen, and/or any other suitable input and/or output device now known or hereafter developed. This may be the case, in particular, when the device 600 serves as a user device described herein. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, such as display, particularly when the device 600 serves as a user device as described herein.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, compact disc (CD) read only memory (ROM) (CD-ROM), digital video disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., fourth generation (4G)/fifth generation (5G)/next generation (nG), an IEEE 802.11 (e.g., Wi-Fi®/Wi-Fib®), IEEE 802.15 (e.g. Wireless Personal Area Networks (WPAN)), IEEE 802.16 (e.g., Worldwide Interoperability for Microwave Access (WiMAX)), Radio-Frequency Identification (RFID), Near Field Communication (NFC), Bluetooth™, millimeter (mm).wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

In one form, a method is provided that comprises analyzing wireless communication of a wireless client device on a wireless network, generating, based on the analyzing, a risk measurement associated with the wireless communication, and providing to the wireless client device, based on the risk measurement, an advisory on rotation of a device address.

In another form, an apparatus is provided that comprises a network interface configured to enable network communications, one or more processors, and one or more memories storing instructions that when executed configure the one or more processors to perform operations comprising analyzing wireless communication of a wireless client device on a wireless network, generating, based on the analyzing, a risk measurement associated with the wireless communication, and providing to the wireless client device, based on the risk measurement, an advisory on rotation of a device address.

The methods presented herein may be embodied in a non-transitory computer readable storage medium comprising instructions that when executed configure one or more processors to perform the operations of the method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method, comprising:
    analyzing wireless communication of a wireless client device on a wireless network;
    generating, based on the analyzing, a risk measurement associated with the wireless communication, wherein the risk measurement is generated based, at least in part, on determining a density of other wireless client devices on the wireless network that are an equivalent device type as a device type of the wireless client device and that are located within a predefined threshold distance from the wireless client device; and
    transmitting to the wireless client device, based on the risk measurement, an advisory on rotation of a device address of the wireless client device, wherein the advisory comprises one or more attributes indicating a recommended address rotation strategy for the wireless client device that indicates a recommended timing for which the wireless client device is recommended to perform at least one next device address rotation.

2. The method of claim 1, further comprising determining one or more of: a use of unprotected identifiers in the wireless communication, a correlation between device addresses of multiple radios of the wireless client device, a frequency of probe traffic on the wireless network, and/or a correlation between signatures of a plurality of communications of the wireless client device, wherein the generating of the risk measurement is further based on the determining.

3. The method of claim 2, further comprising identifying a transmission of vendor specific information elements, a sleep/wake pattern, block acknowledgment pattern, or packet transmission pattern of the wireless client device, wherein the signatures are based on the identifying.

4. The method of claim 1, wherein at least one attribute of the one or more attributes indicated by the recommended address rotation strategy indicates a delay for the recommended timing of a next device address rotation for the wireless client device.

5. The method of claim 1, wherein at least one attribute of the one or more attributes indicated by the recommended address rotation strategy indicates a rate for the recommended timing of a plurality of next device address rotations for the wireless client device.

6. The method of claim 1, wherein at least one attribute of the one or more attributes indicated by the recommended address rotation strategy indicates a maximum time interval between device address rotations for the recommended timing of a plurality of next device address rotations of the wireless client device.

7. The method of claim 1, further comprising determining a transmission power of the wireless client device, wherein the risk measurement is further based on the transmission power.

8. An apparatus, comprising:
    a network interface configured to enable network communications;
    one or more processors; and
    one or more memories storing instructions that when executed configure the one or more processors to perform operations comprising:
        analyzing wireless communication of a wireless client device on a wireless network;
        generating, based on the analyzing, a risk measurement associated with the wireless communication, wherein the risk measurement is generated based, at least in part, on determining a density of other wireless client devices on the wireless network that are an equivalent device type as a device type of the wireless client device and that are located within a predefined threshold distance from the wireless client device; and
        transmitting to the wireless client device, based on the risk measurement, an advisory on rotation of a device address of the wireless client device, wherein the advisory comprises one or more attributes indicating a recommended address rotation strategy for the wireless client device that indicates a recommended timing for which the wireless client device is recommended to perform at least one next device address rotation.

9. The apparatus of claim 8, the operations further comprising determining one or more of: a use of unprotected identifiers in the wireless communication, a correlation between device addresses of multiple radios of the wireless client device, a frequency of probe traffic on the wireless network, and/or a correlation between signatures of a plurality of communications of the wireless client device, wherein the generating of the risk measurement is further based on the determining.

10. The apparatus of claim 9, the operations further comprising identifying a transmission of vendor specific information elements, a sleep/wake pattern, block acknowledgment pattern, or packet transmission pattern of the wireless client device, wherein the signatures are based on the identifying.

11. The apparatus of claim 8, wherein at least one attribute of the one or more attributes indicated by the recommended address rotation strategy indicates a delay for the recommended timing of a next device address rotation for the wireless client device.

12. The apparatus of claim 8, wherein at least one attribute of the one or more attributes indicated by the recommended address rotation strategy indicates a rate for the recommended timing of a plurality of next device address rotations for the wireless client device.

13. A non-transitory computer readable storage medium comprising instructions that when executed configure one or more processors to perform operations comprising:
    analyzing wireless communication of a wireless client device on a wireless network;
    generating, based on the analyzing, a risk measurement associated with the wireless communication, wherein the risk measurement is generated based, at least in part, on determining a density of other wireless client devices on the wireless network that are an equivalent device type as a device type of the wireless client device and that are located within a predefined threshold distance from the wireless client device; and transmitting to the wireless client device, based on the risk measurement, an advisory on rotation of a device address of the wireless client device, wherein the advisory comprises one or more attributes indicating a recommended address rotation strategy for the wireless client device that indicates a recommended timing for which the wireless client device is recommended to perform at least one next device address rotation.

14. The non-transitory computer readable storage medium of claim 13, the operations further comprising determining one or more of: a use of unprotected identifiers in the wireless communication, a correlation between device addresses of multiple radios of the wireless client device, a frequency of probe traffic on the wireless network, and/or a correlation between signatures of a plurality of communications of the wireless client device, wherein the generating of the risk measurement is further based on the determining.

15. The non-transitory computer readable storage medium of claim 14, the operations further comprising identifying a transmission of vendor specific information elements, a sleep/wake pattern, block acknowledgment pattern, or packet transmission pattern of the wireless client device, wherein the signatures are based on the identifying.

16. The method of claim 1, wherein the device address of the wireless client device is a Media Access Control (MAC) address of the wireless client device.

17. The method of claim 1, wherein the advisory further comprises an acceptable use policy that defines a maximum time interval that the wireless client device can operate without performing the at least one next device address rotation and the wireless client device is to acknowledge the acceptable use policy.

18. The method of claim 17, wherein the acceptable use policy further defines a minimum time between each of a plurality of next device address rotations to be performed by the wireless client device.

19. The method of claim 1, wherein determining the density includes determining the density based on a density weight function that is based on a number of a plurality of wireless client devices on the wireless network within an area and on a number of the other wireless client devices on the wireless network that are an equivalent device type as the wireless client device within the area.

20. The non-transitory computer readable storage medium of claim 13, wherein determining the density includes determining the density based on a density weight function that is based on a number of a plurality of wireless client devices on the wireless network within an area and on a number of the other wireless client devices on the wireless network that are an equivalent device type as the wireless client device within the area.

* * * * *